United States Patent [19]

Fukushima

[11] Patent Number: 4,844,216

[45] Date of Patent: Jul. 4, 1989

[54] TORQUE CONVERTER PROVIDED WITH VIBRATION DAMPER

[75] Inventor: Hirotaka Fukushima, Neyagawa, Japan

[73] Assignee: Kabushiki Kaisha Daikin Seisakusho, Osaka, Japan

[21] Appl. No.: 178,395

[22] Filed: Apr. 6, 1988

[30] Foreign Application Priority Data

Apr. 8, 1987 [JP] Japan ................... 62-86497

[51] Int. Cl.$^4$ ............... F16H 45/02; F16D 33/18
[52] U.S. Cl. ................. 192/3.26; 192/3.29; 192/30 V; 192/48.3; 192/103 B; 60/338
[58] Field of Search ............. 192/3.21, 3.25, 3.26, 192/3.28, 3.29, 3.3, 3.31, 3.33, 30 V, 48.3, 103 B, 106.2; 60/338

[56] References Cited

U.S. PATENT DOCUMENTS

| | | | |
|---|---|---|---|
| 3,275,108 | 9/1966 | General et al. | 192/3.3 |
| 4,027,757 | 6/1977 | Radke et al. | 192/106.2 |
| 4,113,075 | 9/1978 | Walker | 192/3.31 |
| 4,143,561 | 3/1979 | Melhorn | 192/106.2 X |
| 4,274,519 | 6/1981 | Moroto et al. | 192/3.28 |
| 4,572,339 | 2/1986 | Koshimo | 192/3.31 |
| 4,576,260 | 3/1986 | Koshimo | 192/3.31 |
| 4,690,257 | 9/1987 | Suzuki et al. | 192/3.31 |

Primary Examiner—Rodney H. Bonck
Assistant Examiner—Richard M. Lorence
Attorney, Agent, or Firm—Armstrong, Nikaido, Marmelstein, Kubovcik & Murray

[57] ABSTRACT

A torque converter provided with a vibration damper includes an input member, an pump connected to the input member, a turbine located between the pump and the input member, a lock-up clutch disk frictionally engagable with the input member, an output shaft connected to the turbine and the lock-up clutch disk, and a damper mechanism disposed between the radially outer portions of the turbine and the lock-up clutch disk. The damper mechanism includes a damper weight rotatably and concentrically arranged with respect to the input member and the output shaft, a centrifugal clutch including an output member, a centrifugal weight adapted to be frictionally engaged with the output member by a centrifugal force and a weight support fixed to the turbine and radially movably supporting the centrifugal weight, and a damper spring circumferentially connecting the output member of the centrifugal clutch to the damper weight.

5 Claims, 1 Drawing Sheet

TORQUE CONVERTER PROVIDED WITH VIBRATION DAMPER

BACKGROUND OF THE INVENTION

The present invention relates to a torque conveter provided with a lock-up clutch and a vibration damper, which can be applied to automobiles for preventing vibration in a driving system thereof.

Torque converters provided with lock-up clutches are disclosed e.g., in U.S. Pat. Nos. 4,576,260 and 4,572,339, which are commonly assigned to, and U.S. Pat. No. 4,027,757. In these lock-up clutches, damper springs and friction members are disposed between input members and output members for preventing transmission of vibration to an output shaft of the torque converter.

However, in some cases, such damper springs and friction members can not sufficiently absorb the vibration.

Accordingly it is an object of the invention to provide a vibration damper for a torque converter provided with a lock-up clutch, overcoming the above-noted problem.

SUMMARY OF THE INVENTION

According to the invention, a torque converter provided with a vibration damper includes an input member, an pump connected to the input member, a turbine located between the pump and the input member, a lock-up clutch disk frictionally engagable with the input member, an output shaft connected to the turbine and the lock-up clutch disk, and a damper mechanism disposed between the radially outer portions of the turbine and the lock-up clutch disk, said damper mechanism including a damper weight rotatably and concentrically arranged with respect to the input member and the output shaft, a centrifugal clutch including an output member, a centrifugal weight adapted to be frictionally engaged with the output member by a centrifugal force and a weight support fixed to the turbine and radially movably supporting the centrifugal weight, and a damper spring circumferentially connecting the output member of the centrifugal clutch to the damper weight.

A mass of said weights and characteristics of said damper springs are so determined that the resonance of the turbine, the lock-up clutch and the output shaft may be prevented.

In the embodiment, said damper weight may have a cylindrical portion extending along the output shaft and a flange portion extending radially inwardly from an end of the cylindrical portion remote from the pump. The flange portion is connected to a support plate, of which inner periphery is rotatably supported by a hub of an output plate of the lock-up clutch disk.

Said output member of the centrifugal clutch includes a drum or cylindrical portion, and the centrifugal weight is adapted to be pressed onto the inner periphery of the drum.

Said damper spring is disposed between connecting members rigidly connected to said drum and said weight, respectively.

DETAILED DESCRIPTION OF THE PREFERRED EMBODIMENT

Figure 1:
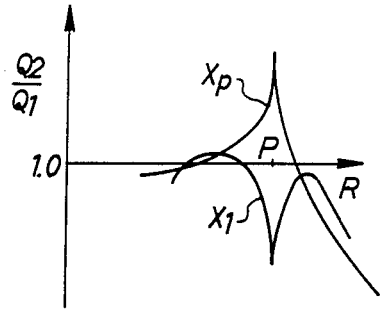
FIG. 1 is a fragmentary schematic sectional view of a torque conveter of an embodiment according to the invention.

Referring to FIG. 1, a flywheel 10 of an engine is provided with a ring gear 12 and is connected to a front cover 16, i.e., input member, of a torque converter 14 through bolts 18. The torque converter 14 includes a pump 20 (pump impeller) fixed to outer peripheral wall of the front cover 16, a turbine 22 located between the pump 20 and a radial wall of the front cover 16, and a stator 24 located between the radially inner portions of the pump 20 and the turbine 22.

A lock-up clutch disk 26 is disposed between the turbine 22 and the front cover 16, and a damper mechanism 28 is disposed between the clutch disk 26 and the turbine 22.

The lock-up clutch disk 26 includes an annular piston 30 or piston plate, an annular friction facting 32, compressible coil springs 34 or other elastic members, and an output plate 36.

The piston 30 is sealingly and slidably fitted at the inner periphery thereof around an output hub 40 through a seal 38. The hub 40 is splined to an output shaft 41, and said turbine 22 and said output plate 36 of the lock-up clutch disk 26 is rigidly connected to the hub 40.

The friction facing 32 is fixed to the radially outer portion of the piston 30 and is adapted to be pressed and frictionally connected to the radial wall of the front cover 16 when the piston 30 is pushed toward the front cover 16 by a high hydraulic pressure.

Said damper springs 34 are circumferentially spaced from each other. Each or each set of the springs 34 is disposed between the output plate 36 and side plates 42 which are fixed to the piston 30. The output plate 36 is axially movable with respect to the springs 34 for allowing axial movement of the piston 30.

The damper mechanism 28 includes an support member 44, an annular damper weight 46, damper spring mechanism 48 and a centrifugal clutch 50. The relatively bulky members such as the weight 46, the spring mechanism 48 and the clutch 50 are arranged in a space between the radially outer portions of a curved shell of the turbine 22 and the lock-up clutch disk 26. Therefore, the damper mechanism 28 does not substantially increase the overall size of the torque converter as compared with the conventional structures, because the conventional torque converters generally include spaces, in which no mechanisms are disposed, corresponding to this space.

The support plate 44 is provided with hydraulic passages (not shown) for connecting spaces at opposite sides thereof. The inner periphery of the support plate 44 is rotatably supported by a hub of the output plate 36 through a bearing 45. The outer periphery of the plate 44 is connected to the damper weight 46. The weight 46 integrally includes a cylindrical portion concentric with the output shaft 41 and a flange portion extending radially inwardly from an end of the cylindrical portion remote from the pump 20. Said support plate 44 is fixed to this flange portion.

The spring mechanism 48 includes circumferentially spaced compressible coil springs 58 or other elastic members, which are disposed between connecting members 52 and 54 for circumferentially elastically connecting the weight 46 and the centrifugal clutch 50. The members 52 are formed by a pair of plates which are rigidly connected to the weight 46. The other member 54 (output member of the centrifugal clutch) is formed as follows.

The centrifugal clutch 50 includes a drum 56 (output member), centrifugal weights and weight support. The drum 56 is of axially extending cylindrical form, and said member 54 is rigidly fixed or integrally formed at an end of the drum 56 remote from the pump 20. Said centrifugal weight of the clutch 50 is radially movably supported by the weight support, which is fixed to the turbine shell, and is adapted to be pressed onto and frictionally connected to the inner periphery of the drum 56 by a centrifugal force caused by a high speed driving of the turbine 22.

When the weight is connected to the drum 56, i.e., the clutch 50 is engaged, the turbine 22 is connected through the clutch 50 to the damper spring mechanism 48 and the weight 46, so that resonance and vibration of the turbine 22 as well as the lock-up clutch disk 26 and the output shaft 41 is damped by the weight 46 and the spring mechanism 48. Naturally, the mass, particularly inertial mass, of the weight 46 and the elastic characteristics of the spring mechanism 48 are so determined that the above damping effect can be effectively attained, as will be detailed below.

Figure 2:
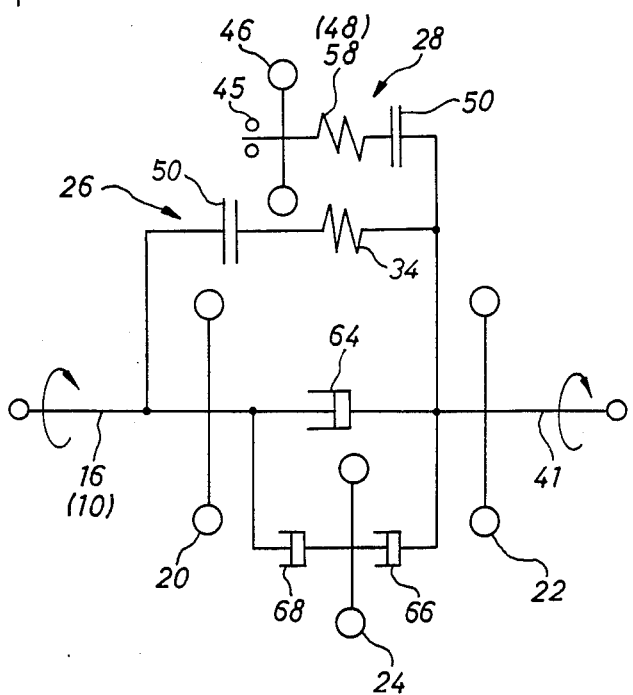
FIG. 2 is a structural schematic view of the torque converter in FIG. 1.

In FIG. 2, a hydraulic damper 64 is formed by an operation oil between the pump 20 and the turbine 22. Hydraulic dampers 66 and 68 are also formed by virtue of the stator 24.

Figure 3:
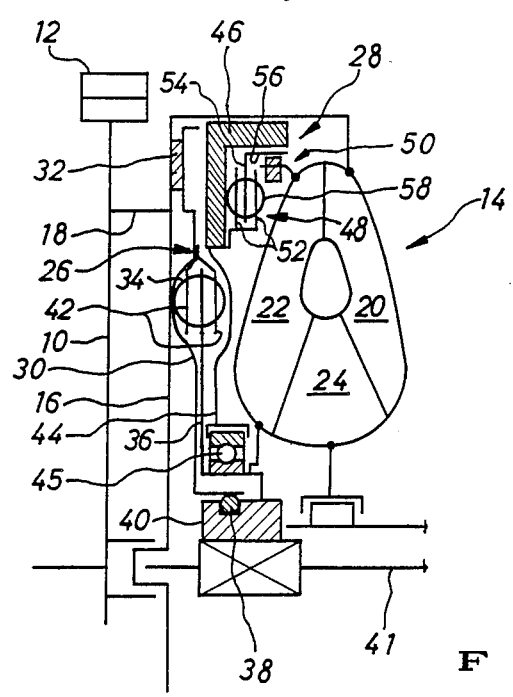
FIG. 3 is a graph showing damping characteristics of a conventional torque conveter and that in FIG. 1.

In FIG. 3, at Q1 is indicated an angular acceleration of the front cover 16 and at Q2 is indicated an angular acceleration of the output shaft 41. A curve Xp indicates relationship between the ratio (Q2/Q1) and a speed R of the front converter in the conventional torque converter without the damper mechanism, and a curve X1 indicates relationship between the ratio (Q2/Q1) and the speed R in the torque converter shown in FIGS. 1 and 2.

As apparent from the curve Xp, the resonance, and thus noises, are generated at a high speed point of P in the conventional torque converter. In the torque converter in FIGS. 1 and 2, the mass of the weight 46 and the characteristics of the spring mechanism 48 are so determined that the ratio (Q2/Q1) may become a minimum value at the point of P.

According to the invention, as described hereinbefore, the resonance and vibration can be effectively prevented by the damper mechanism 28. Further, since the damper mechanism 28 includes the centrifugal clutch 50 which is engaged only in the high speed driving of the turbine 22, the mechanism 28, particularly the weight 46, does not deteriorate the response of the operation of the turbine when the the turbine 22 is accelerating relatively to the pump 20.

The present invention is not restricted to the illustrated embodiment, and various modification can be employed. For example, the invention may be employed in torque converters including four elements.

What is claimed is:

1. A torque converter including an input member, a pump connected to the input member, a turbine located between the pump and the input member, a lock-up clutch disk frictionally engagable with said input member, an output shaft connected to said turbine and said lock-up clutch disk, and a vibration damper mechanism disposed between radially outer portions of said turbine and said lock-up clutch disk, said damper mechanism including a damper weight rotatably and concentrically arranged with respect to said input member and said output shaft, a centrifugal clutch including an output member, a centrifugal weight adapted to be frictionally engaged with said output member by a centrifugal force and a weight support fixed to said turbine and radially movably supporting said centrifugal weight, and a damper spring circumferentially connecting said output member of said centrifugal clutch to said damper weight.

2. A torque converter of claim 1 wherein the mass of said weights and characteristics of said damper springs are so determined that resonance of said turbine, said lock-up clutch disk and said output shaft is prevented.

3. A torque converter of claim 1 wherein said damper weight has a cylindrical portion concentric with the output shaft and a flange portion extending radially inwardly from an end of said cylindrical portion remote from said pump, and said flange portion is connected to a support plate, said support plate having an inner periphery rotatably supported by a hub of a output plate of said lock-up clutch disk.

4. A torque converter of claim 1 wherein said output member of said centrifugal clutch includes a drum, and said centrifugal weight is adapted to be pressed onto an inner periphery of said drum.

5. A damper disk of claim 1 wherein said damper spring is disposed between connecting members rigidly connected to said drum and said weight, respectively.

* * * * *